(12) United States Patent
Amer et al.

(10) Patent No.: US 10,523,947 B2
(45) Date of Patent: Dec. 31, 2019

(54) SERVER-BASED ENCODING OF ADJUSTABLE FRAME RATE CONTENT

(71) Applicant: ATI Technologies ULC, Markham (CA)

(72) Inventors: Ihab Amer, Stouffville (CA); Boris Ivanovic, Richmond Hill (CA); Gabor Sines, Toronto (CA); Yang Liu, Toronto (CA); Ho Hin Lau, Stouffville (CA); Haibo Liu, North York (CA); Kyle Plumadore, Toronto (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 15/721,078

(22) Filed: Sep. 29, 2017

(65) Prior Publication Data

US 2019/0104311 A1    Apr. 4, 2019

(51) Int. Cl.
| | |
|---|---|
| H04N 7/12 | (2006.01) |
| H04N 19/137 | (2014.01) |
| H04N 19/115 | (2014.01) |
| H04N 19/132 | (2014.01) |
| H04N 19/177 | (2014.01) |
| A63F 13/335 | (2014.01) |

(52) U.S. Cl.
CPC ......... *H04N 19/137* (2014.11); *H04N 19/115* (2014.11); *H04N 19/132* (2014.11); *H04N 19/177* (2014.11); *A63F 13/335* (2014.09)

(58) Field of Classification Search
CPC .... H04N 19/137; H04N 19/115; A63F 13/335

USPC ..................................................... 375/240.02
See application file for complete search history.

(56) References Cited

U.S. PATENT DOCUMENTS

| | | |
|---|---|---|
| 5,930,390 A | 7/1999 | Coelho |
| 6,524,198 B2 | 2/2003 | Takeda |
| 6,618,397 B1 | 9/2003 | Huang |
| 6,680,976 B1 | 1/2004 | Chen et al. |
| 6,683,988 B1 | 1/2004 | Fukunaga et al. |
| 6,754,234 B1 | 6/2004 | Wiesner et al. |

(Continued)

OTHER PUBLICATIONS

Non-Final Office Action in U.S. Appl. No. 15/686,892, dated Mar. 7, 2019, 14 pages.

(Continued)

*Primary Examiner* — Richard T Torrente
(74) *Attorney, Agent, or Firm* — Rory D. Rankin; Kowert, Hood, Munyon, Rankin & Goetzel, P.C

(57) ABSTRACT

Systems, apparatuses, and methods for encoding bitstreams of uniquely rendered video frames with variable frame rates are disclosed. A rendering unit and an encoder in a server are coupled via a network to a client with a decoder. The rendering unit dynamically adjusts the frame rate of uniquely rendered frames. Depending on the operating mode, the rendering unit conveys a constant frame rate to the encoder by repeating some frames or the rendering unit conveys a variable frame rate to the encoder by conveying only uniquely rendered frames to the encoder. Depending on the operating mode, the encoder conveys a constant frame rate bitstream to the decoder by encoding repeated frames as skip frames, or the encoder conveys a variable frame rate bitstream to the decoder by dropping repeated frames from the bitstream.

20 Claims, 7 Drawing Sheets

(56) References Cited

U.S. PATENT DOCUMENTS

| | | | |
|---|---|---|---|
| 7,471,823 | B2 | 12/2008 | Ubillos et al. |
| 7,813,000 | B2 | 10/2010 | Ternasky et al. |
| 8,175,181 | B1 | 5/2012 | Nabar et al. |
| 9,270,969 | B2 | 2/2016 | Hong et al. |
| 9,407,923 | B2 | 8/2016 | Barak |
| 9,924,134 | B2 | 3/2018 | Glen |
| 2001/0033286 | A1 | 10/2001 | Stokes et al. |
| 2005/0223165 | A1 | 10/2005 | Schmidt et al. |
| 2006/0171596 | A1 | 8/2006 | Sung et al. |
| 2008/0049651 | A1 | 2/2008 | Chang et al. |
| 2009/0052537 | A1 | 2/2009 | Burazerovic et al. |
| 2009/0148058 | A1* | 6/2009 | Dane ............... H04N 5/145 382/251 |
| 2009/0213940 | A1* | 8/2009 | Steinbach ......... H04N 19/176 375/240.27 |
| 2010/0050225 | A1 | 2/2010 | Bennett |
| 2010/0157154 | A1 | 6/2010 | Kobayashi et al. |
| 2011/0050695 | A1 | 3/2011 | Sullivan |
| 2011/0066262 | A1 | 3/2011 | Kelly |
| 2011/0157196 | A1 | 6/2011 | Nave et al. |
| 2011/0263332 | A1 | 10/2011 | Mizrachi |
| 2011/0299606 | A1* | 12/2011 | Chen ................. H04L 29/08 375/240.26 |
| 2012/0008679 | A1 | 1/2012 | Bakke |
| 2012/0236934 | A1 | 9/2012 | Chen et al. |
| 2012/0243009 | A1 | 9/2012 | Chapman et al. |
| 2013/0039594 | A1 | 2/2013 | Chen et al. |
| 2013/0053141 | A1 | 2/2013 | Guérin et al. |
| 2013/0058394 | A1 | 3/2013 | Nilsson et al. |
| 2013/0076771 | A1 | 3/2013 | Bachman et al. |
| 2013/0083161 | A1 | 4/2013 | Hsu et al. |
| 2013/0335432 | A1 | 12/2013 | Iwasaki |
| 2014/0028876 | A1 | 1/2014 | Mills |
| 2014/0194196 | A1 | 7/2014 | Hoy et al. |
| 2014/0211860 | A1 | 7/2014 | Zhao |
| 2014/0267780 | A1 | 9/2014 | Spears et al. |
| 2014/0317068 | A1 | 10/2014 | Yang et al. |
| 2014/0376612 | A1 | 12/2014 | Chen et al. |
| 2016/0381392 | A1 | 12/2016 | Wiegand et al. |
| 2017/0142447 | A1 | 5/2017 | Toth et al. |
| 2018/0091819 | A1 | 3/2018 | Cook et al. |
| 2019/0068983 | A1 | 2/2019 | Ryan et al. |
| 2019/0158704 | A1 | 5/2019 | Sines et al. |
| 2019/0182308 | A1 | 6/2019 | Vu et al. |

OTHER PUBLICATIONS

Non-Final Office Action in U.S. Appl. No. 15/834,400, dated Feb. 27, 2019, 16 pages.

Final Office Action in U.S. Appl. No. 15/834,400, dated Jul. 10, 2019, 15 pages.

Non-Final Office Action in U.S. Appl. No. 15/816,765, dated Jun. 26, 2019, 11 pages.

International Search Report and Written Opinion in International Application No. PCT/IB2018/057511, dated Jan. 22, 2019, 8 pages.

Cheng et al., U.S. Appl. No. 16/263,709, entitled "Multiple Application Cooperative Frame-Based GPU Scheduling", filed Jan. 31, 2019, 33 pages.

\* cited by examiner

US 10,523,947 B2

SERVER-BASED ENCODING OF ADJUSTABLE FRAME RATE CONTENT

BACKGROUND

Description of the Related Art

Various applications perform real-time encoding and decoding of images or video content. For example, cloud gaming and gaming spectatorship are examples of applications which include support for real-time encoding and decoding of content. Latency, quality, bitrate, power, and performance challenges typically arise while delivering such a workload in real-time. Encoders and decoders typically operate independently, resulting in inefficiencies and performance degradation. This can result in extra power consumption at both a server and a client, as well as overloading a network with unnecessary bandwidth, impacting the overall bitrate, quality, and/or latency requirements.

In view of the above, improved methods for managing video content are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
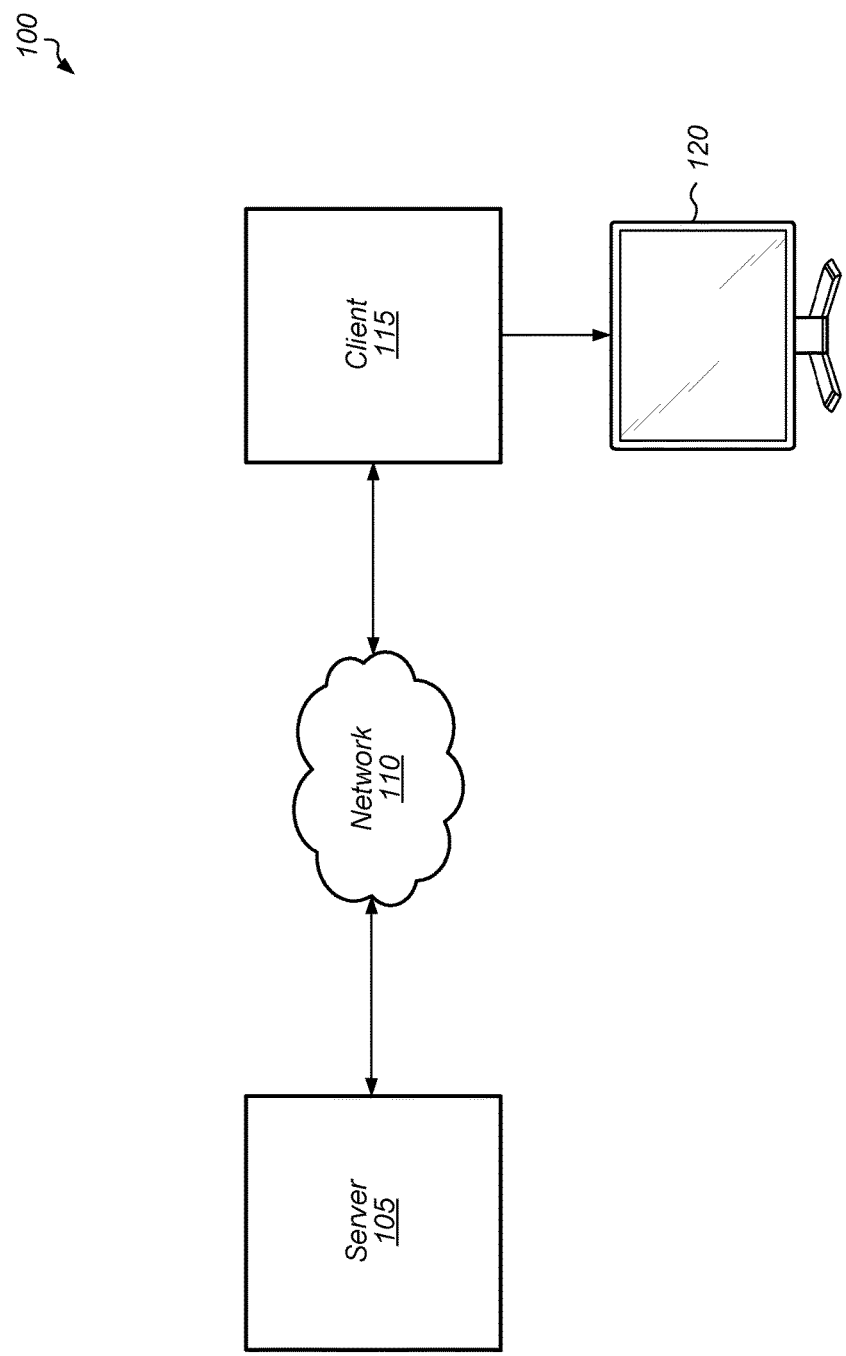
FIG. 1 is a block diagram of one embodiment of a system for encoding and decoding content.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for encoding bitstreams with variable frame rates are disclosed herein. In one embodiment, a system includes a rendering unit and an encoder in a server coupled via a network to a client with a decoder. The rendering unit is configured to dynamically adjust the frame rate of uniquely rendered frames. Depending on the embodiment, the rendering unit conveys frames at a constant frame rate to the encoder by repeating some frames or the rendering unit conveys frames at a variable frame rate to the encoder by conveying only uniquely rendered frames to the encoder. The encoder is configured to encode the rendered frames and then convey the encoded frames to the decoder via the network. Depending on the embodiment, the encoder conveys a constant frame rate bitstream to the decoder by encoding repeated frames as skip frames, or the encoder conveys a variable frame rate bitstream to the decoder by dropping repeated frames from the bitstream.

In one embodiment, the rendering unit adjusts, on a dynamic basis, the rate at which frames are rendered based on the amount of motion in the application being rendered. For example, when a video game application is being executed, the video game application has different scenes with different amounts of action or motion per scene. When the video game application has a scene with less action, like the user is reading a map or waiting for some event to occur, the scene can be rendered at a lower frame rate without effecting the user's viewing experience. Accordingly, in one embodiment, when the scene has less action, the video game application sends an indication to the rendering unit that the scene can be rendered with a lower frame rate. By lowering the frame rate at which the scene is rendered, the power consumed by the rendering unit is reduced. On the other hand, when the video game application is engaged in a scene with more action, like the user is chasing something, the user is fighting a battle, or the scenery is changing rapidly, the scene can be rendered at an increased frame rate to enhance the user's viewing experience. Accordingly, in one embodiment, when the scene has more action, the video game application sends an indication to the rendering unit that the scene can be rendered with an increased frame rate.

In one embodiment, the rendering unit is located on a server in the cloud, and rendered content is being conveyed to a client via a network. For example, a cloud gaming application can be executed, with the gaming application video frames being rendered in the cloud. In this scenario, the rendering unit will convey rendered frames to an encoder. The rendering unit can be implemented using any of various types of processing units. In one embodiment, the rendering unit is implemented on a graphics processor or graphics subsystem. In another embodiment, the rendering unit is implemented on a general purpose central processing unit (CPU). For example, in this embodiment, a game, a shared presentation, a remote presentation, or other content can be drawn by a general purpose CPU. In other embodiments, the rendering unit can be implemented on other types of processing units (e.g., application specific integrated circuit (ASIC), field programmable gate array (FPGA), digital signal processor (DSP)).

The encoder will receive the rendered frames from the rendering unit, and then the encoder encodes the rendered frames and send a bitstream containing the encoded frames to a decoder on the client. The frame rate of uniquely rendered frames can vary, as previously described. Accordingly, the encoder can utilize different techniques to process the variable frame rate of the uniquely rendered frames without causing a disruption or negative viewing experience for the user. Also, the encoder can utilize different techniques to achieve a reduction in power consumption at both the encoder on the server and the decoder on the client.

In one embodiment, the rendering unit adjusts the rate at which frames are rendered, but the rendering unit adds repeated frames to the frames sent to the encoder to maintain a constant frame rate. In this embodiment, the rendering unit sends frames to the encoder at a fixed frame rate even though the rate at which frames are rendered varies. For example, during a first scene of a video game, the rendering unit renders unique frames at 60 frames per second (fps) and sends the 60 fps to the encoder. In a second scene of the video game which has less action than the first scene, the rendering unit renders unique frames at 30 fps. Rather than sending 30 fps to the encoder, the rendering unit repeats each rendered frame one time, with the result that 60 fps are sent to the encoder, with every other frame a repeat of the previous frame. In this embodiment, the encoder receives frames at a fixed rate from the rendering unit.

In one embodiment, the rendering unit notifies the encoder of which frames are repeat frames. In another embodiment, the rendering unit does not notify the encoder of which frames are repeat frames. In this embodiment, the encoder is configured to detect repeat frames in the frames provided by the rendering unit. In one embodiment, the encoder compares each frame to the previous frame to detect if the frames are identical or substantially similar within some threshold amount. Once the encoder detects a repeat frame in the frames provided by the rendering unit, the encoder can utilize any of various techniques for generating an encoded bitstream from the frames.

In one embodiment, the encoder generates frames in the encoded bitstream at a fixed frame rate. In this embodiment, the encoder encodes each repeated frame as a skip frame in the bitstream. Accordingly, in one embodiment, if the decoder is expecting a fixed frame rate of 60 fps, and the encoder is encoding uniquely rendered frames at 30 fps, the encoder can generate a skip frame for every other frame. Encoding a skip frame utilizes a smaller number of bits than an ordinary frame in the bitstream, and so the encoder can utilize more of the bit budget for the uniquely rendered frames to encode these frames with higher fidelity. When the decoder detects a skip frame in the bitstream, the decoder can turn off the processing of at least a portion of the decode pipeline stages and drive the previous frame to the display or to the display compositor (i.e., Windows® Display Window Manager). In another embodiment, the encoder encodes frames at a variable frame rate and generates the encoded bitstream with frames occurring at a variable frame rate.

Referring now to FIG. 1, a block diagram of one embodiment of a system 100 for encoding and decoding content is shown. System 100 includes server 105, network 110, client 115, and display 120. In other embodiments, system 100 can include multiple clients connected to server 105 via network 110, with the multiple clients receiving the same bitstream or different bitstreams generated by server 105. System 100 can also include more than one server 105 for generating multiple bitstreams for multiple clients. In one embodiment, system 100 is configured to implement real-time video encoding and decoding of game content as part of a cloud gaming application. Latency, quality, bitrate, power, and performance challenges typically arise while delivering such a workload in real-time. In another embodiment, system 100 is configured to implement a virtual desktop infrastructure application or a screen sharing application. In other embodiments, system 100 is configured to execute other types of applications.

In one embodiment, server 105 is configured to render video or image frames, encode the frames into a bitstream, and then convey the encoded bitstream to client 115 via network 110. Client 115 is configured to decode the encoded bitstream and generate video or image frames to drive to display 120 or to a display compositor. In one embodiment, server 105 renders video/image frames at a variable frame rate. In one embodiment, server 105 encodes skip frames (or other similar indication) into the encoded bitstream when the rendered frame rate is reduced so as to create an encoded bitstream with a fixed frame rate. In such an embodiment, a skip frame is not considered a "rendered frame." The encoded bitstream with the fixed frame rate is then sent to client 115. In another embodiment, server 105 encodes frames at a variable frame rate into the encoded bitstream which is sent to client 115. Skip frames are frames that are coded as being identical in content to a previous frame. When server 105 adds a skip frame into the encoded bitstream, an indication of the skip frame is encoded into a frame header for the frame. Encoding the skip frame in the frame header indicates that no further image data will be included in the encoded bitstream for this frame. At the decoder on client 115, the content of the skip frame is recovered by reusing the contents of the previous frame.

Network 110 is representative of any type of network or combination of networks, including wireless connection, direct local area network (LAN), metropolitan area network (MAN), wide area network (WAN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. Network 110 can further include remote direct memory access (RDMA) hardware and/or software, transmission control protocol/internet protocol (TCP/IP) hardware and/or software, router, repeaters, switches, grids, and/or other components.

Server 105 includes any combination of software and/or hardware for rendering video/image frames and encoding the frames into a bitstream. In one embodiment, server 105 includes one or more software applications executing on one or more processors of one or more servers. Server 105 also includes network communication capabilities, one or more input/output devices, and/or other components. The processor(s) of server 105 can include any number and type (e.g., graphics processing units (GPUs), central processing units (CPUs), digital signal processors (DSPs), field programmable gate arrays (FPGAs), application specific integrated circuits (ASICs)) of processors. The processor(s) can be coupled to one or more memory devices storing program instructions executable by the processor(s). Similarly, client 115 includes any combination of software and/or hardware for decoding a bitstream and driving frames to display 120. In one embodiment, client 115 includes one or more software applications executing on one or more processors of one or more computing devices. Client 115 can be a computing device, game console, mobile device, streaming media player, or other type of device.

Figure 2:
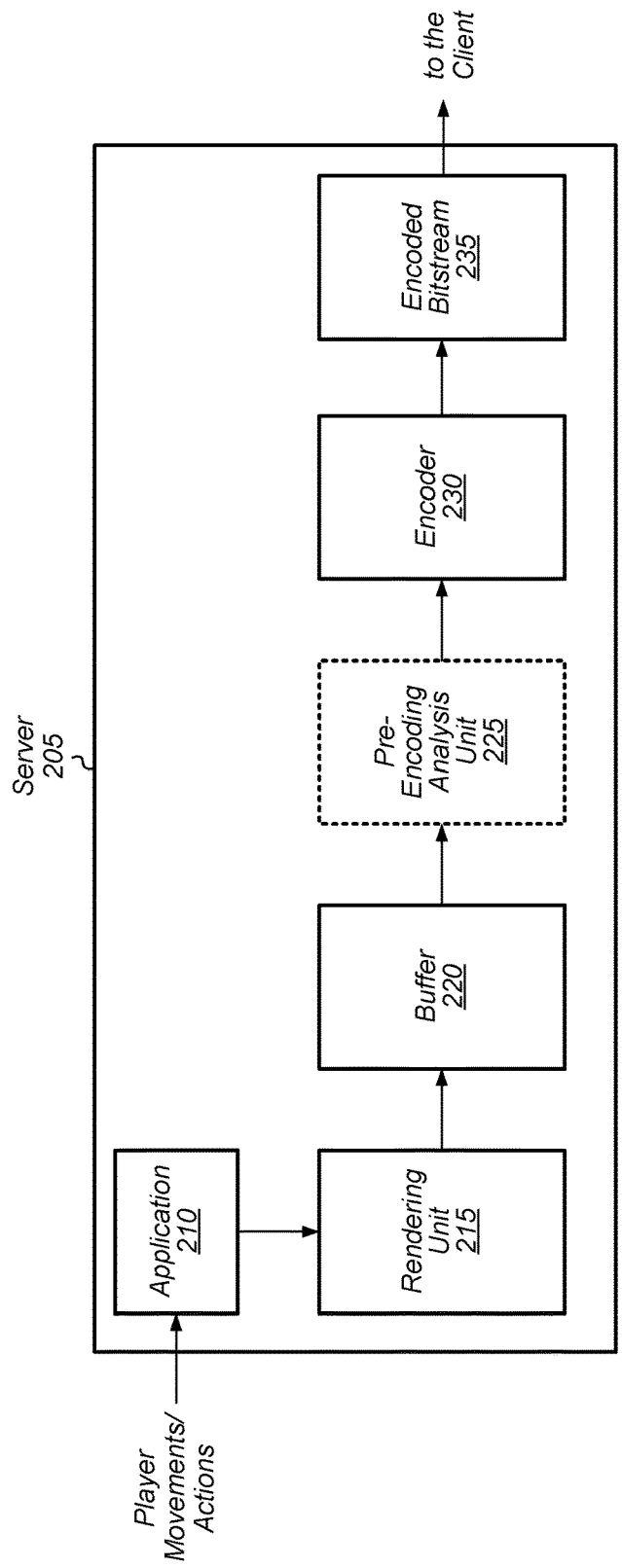
FIG. 2 is a block diagram of one embodiment of a server.

Turning now to FIG. 2, a block diagram of one embodiment of the software components of a server 205 is shown. In one embodiment, server 205 includes an application 210 configured to execute on the physical hardware of server 205. In one embodiment, application 210 is a video game application. For example, application 210 can be a cloud gaming application. In another embodiment, application 210 is a gaming spectatorship application. In various embodiments, server 205 includes one or more processors, one or more memory devices, and additional components which are indicative of a server or other computing device. The various software components shown in FIG. 2 are configured to execute on the hardware components of server 205. In one embodiment, server 205 is part of a cloud computing architecture.

Application 210 is configured to receive inputs (e.g., game commands) which specify user movements/actions which were captured on a client device where the user displays and interacts with the video stream generated by application 210. Application 210 includes graphics information which is provided to rendering unit 215 to render frames for display. Rendering unit 215 is configured to create video frames of a video sequence based on a game state of application 210. In one embodiment, rendering unit 215 is configured to implement a power-savings feature to dynamically regulate the rate at which frames are rendered based on movements in-game. For example, in one embodiment, rendering unit 215 utilizes Radeon™ Chill from Advanced Micro Devices, Inc. as the power-savings feature. In other embodiments, other power-savings features can be utilized. During peak gameplay, the power-savings feature works to deliver the full frame rate potential of rendering unit 215. As movement in the game decreases, the power-savings feature reduces the game-play rendering frame rate, without causing a noticeable effect on the user gaming experience.

In one embodiment, rendering unit 215 writes frames into buffer 220 at a variable frame rate. In this embodiment, the variable frame rate increases as activity in the application 210 increases, and the variable frame rate decreases as activity in the application 210 decreases. In another embodiment, rendering unit 215 delivers frames to buffer 220 at a fixed frame rate. In this embodiment, when the rendering frame rate is less than the maximum rate due to a lack of motion in a particular scene of application 210, rendering unit 215 is configured to repeat frames to adjust the frame rate back to the fixed frame rate. A repeated frame is a duplicate frame of the previous frame rendered by rendering unit 215. It is noted that the term "rendering frame rate" is defined as the rate at which uniquely rendered frames are generated. The rendering frame rate counts only uniquely rendered frames. In other words, the rendering frame rate does not count any repeated frames which are generated to create a fixed frame rate of frames written to buffer 220.

In one embodiment, encoder 230 is configured to detect the repeated frames that rendering unit 215 generates and writes to buffer 220. Server 205 optionally includes pre-encoding analysis unit 225, coupled to or incorporated within encoder 230, to detect repeated frames in the frames written to buffer 220. In one embodiment, pre-encoding analysis unit 225 calculates a sum of absolute differences of pixels from consecutive frames (i.e., back-to-back frames) to determine if the consecutive frames are duplicate frames or have a threshold level of similarity. If pre-encoding analysis unit 225 detects a repeated frame in buffer 220, pre-encoding analysis unit 225 generates an indication for encoder 230.

In another embodiment, rendering unit 215 notifies encoder 230 of repeated frames in buffer 220. For example, in this embodiment, rendering unit 215 specifies the index numbers of frames that are repeated frames. In a further embodiment, rendering unit 215 does not generate repeated frames, but rather writes frames into buffer 220 at a variable frame rate. In this embodiment, the variable frame rate is adjusted based on the movement or lack thereof in a particular scene of application 210. In these two embodiments, server 205 can omit pre-encoding analysis unit 225.

Encoder 230 is configure to retrieve frames from buffer 220, encode the frames, and then generate encoded bitstream 235 from the encoded frames. By encoding (i.e., compressing) the frames generated by rendering unit 215, the amount of data that is sent over the network to the client is reduced. In one embodiment, encoder 230 encodes frames into encoded bitstream 235 at a variable frame rate if encoder 230 determines that the decoder can process frames at a variable frame rate without causing synchronization issues at the display. Otherwise, if the decoder is expecting frames at a fixed frame rate, then encoder 230 encodes the uniquely rendered frames generated by rendering unit 215 and then encodes skip frames into the encoded bitstream 235. The number of skip frames which are encoded is based on how many extra frames are needed to generate the fixed frame rate expected by the decoder.

In one embodiment, encoder 230 is configured to generate encoded bitstream 235 with a given bit budget. For example, encoder 230 can have a specific bit budget based on an available or specified network bandwidth (e.g., 2 megabits per second (mbps)) for bitstream 235, and encoder 230 encodes the frames to meet this specific bit budget. When one or more skip frames are generated by encoder 230, the amount of data generated for the skip frame includes a relatively small number of bits (e.g., in a frame header). The remainder of the bits of the bit budget can be reallocated to the uniquely rendered frames, allowing these frames to be encoded with increase fidelity. As encoded bitstream 235 is generated by encoder 230, encoded bitstream 235 is conveyed from server 205 to the client (not shown). The client receives encoded bitstream 235, decodes bitstream 235 into individual frames, and then drives the frames to the display or to a display compositor.

Figure 3:
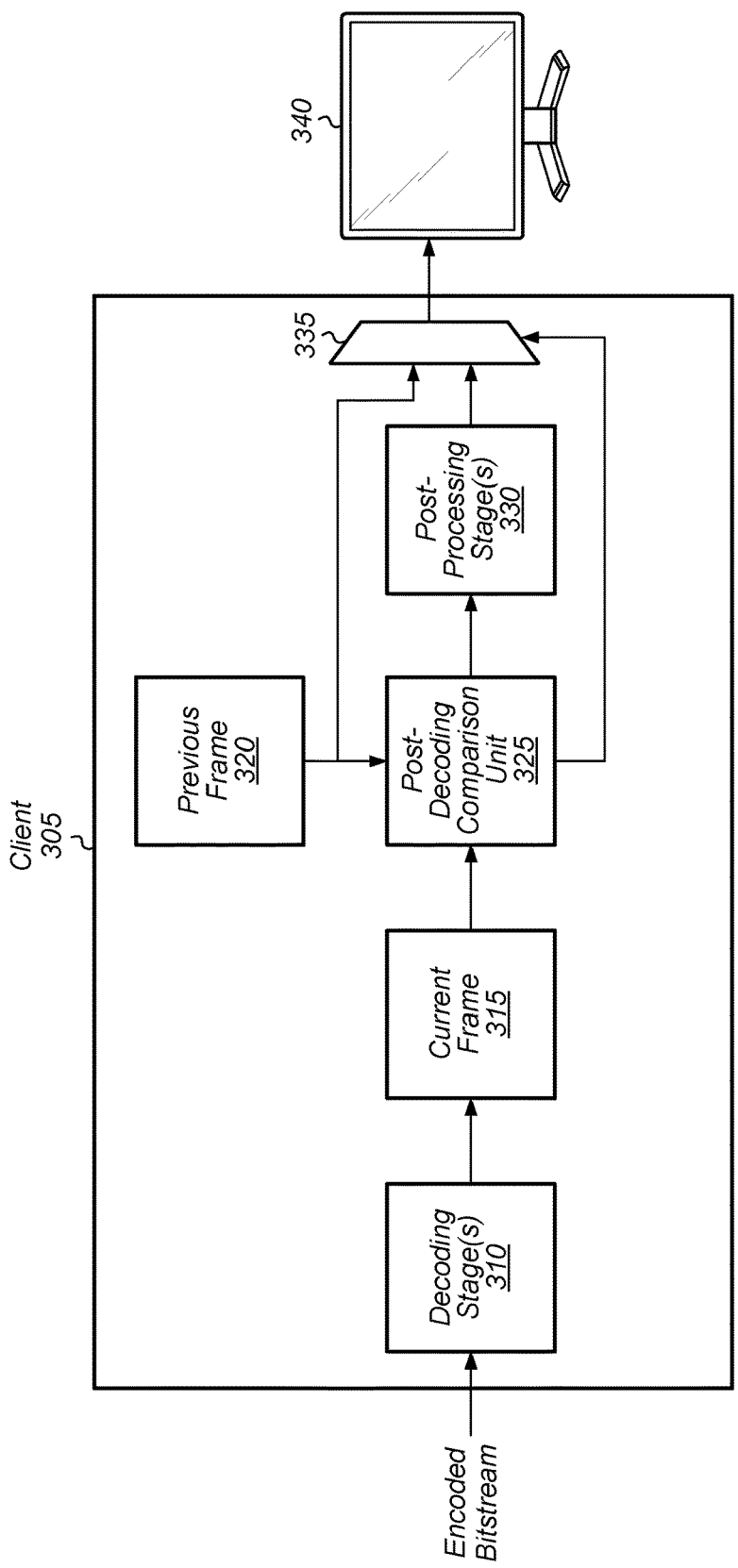
FIG. 3 is a block diagram of one embodiment of a client.

Referring now to FIG. 3, a block diagram of one embodiment of a client 305 is shown. Client 305 includes a decoding pipeline to decode an encoded bitstream received from a server (e.g., server 105 of FIG. 1) via a network (e.g., network 110 of FIG. 1). The stages of client 305 shown in FIG. 3 are indicative of a decoding pipeline in accordance with one embodiment. In other embodiments, client 305 can include other arrangements of decoding pipelines with other numbers and type of stages. In one embodiment, client 305 is configured to generate and convey a game session request to the server. In response to receiving the request, the server is configured to render and encode game content into an encoded bitstream which is conveyed to client 305.

The encoded bitstream is received by client 305 and processed by decoding stage(s) 310. Decoding stage(s) 310 include any number and type of decoding stages, depending on the embodiment. For example, decoding stage(s) 310 can include one or more of a reverse entropy stage, an inverse quantization and inverse transform stage, a compensation stage, a deblocking filter stage, a sample adaptive offset filter stage, and/or one or more other stages. In one embodiment, when client 305 detects a skip frame header in the encoded bitstream, client 305 drives the previous frame 320 to the display or to a display compositor.

If client 305 does not detect a skip frame header in the encoded bitstream, the incoming frame is processed by decoding stage(s) 310 to generate current frame 315. In one embodiment, current frame 315 is compared to previous frame 320 by post-decoding comparison unit 325. If post-decoding comparison unit 325 determines that current frame 315 is the same or substantially the same as previous frame 320, then post-processing stage(s) 330 are turned off (e.g., power-gated) and previous frame 320 is driven to display 340 via multiplexer 335. Otherwise, if current frame 315 is not the same or not substantially the same as previous frame 320, then current frame 315 is processed by post-processing stage(s) 330 and then driven to display 340 via multiplexer 335. Post-processing stage(s) 330 can include one or more of a de-noising filter stage, scaling stage, resizing stage, color space conversion stage, and/or one or more other stages.

Figure 4:
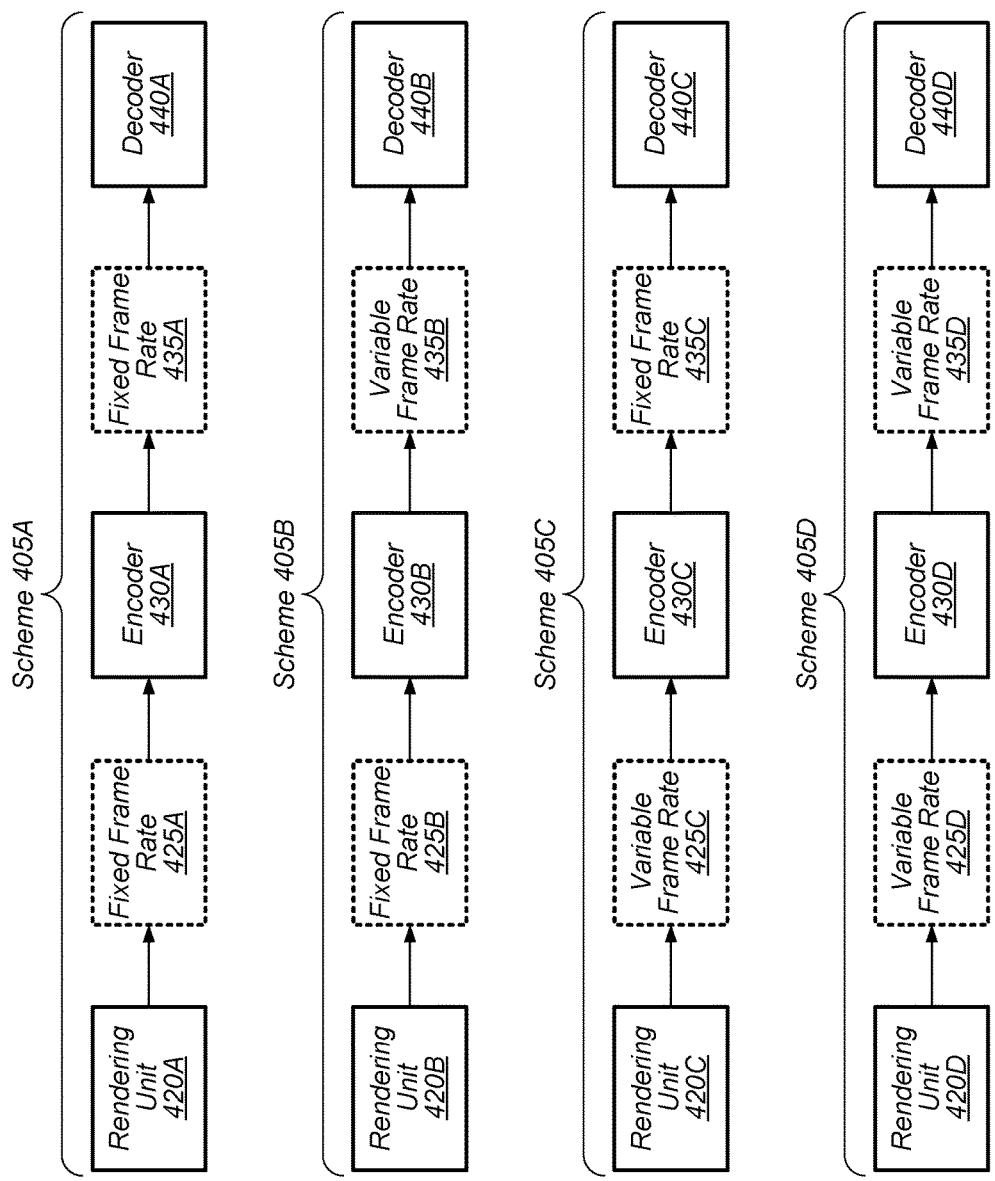
FIG. 4 is a block diagram of different rendering and encoding schemes in accordance with various embodiments.

Turning now to FIG. 4, a block diagram of different rendering and encoding schemes 405A-D is shown. In one embodiment, scheme 405A is implemented with rendering unit 420A rendering frames at a fixed frame rate 425A. In this embodiment, rendering unit 420A can render unique frames at a variable rate but add repeated frames to the uniquely rendered frames so as to provide a fixed frame rate 425A to encoder 430A. For example, if encoder 430A is expecting to receive frames at 60 fps but rendering unit 420A is temporarily rendering frames at 30 fps, rendering unit 420A can repeat each rendered frame so as to provide 60 fps to encoder 430A. Encoder 430A then encodes the frames and generates a bitstream with a fixed frame rate 435A. Decoder 440A decodes the bitstream with fixed frame rate 435A to generate decoded frames which are driven to the display or to a display compositor. Scheme 405A illustrates a standard way of rendering and encoding that has been used in the prior art. The other schemes 405B-D utilize other approaches which differ from the traditional scheme 405A.

Alternatively, in another embodiment, scheme 405B is implemented with encoder 430B detecting repeated frames added to the rendered frames. In this embodiment, rendering unit 420B provides a fixed frame rate 425B of frames to encoder 430B. When encoder 430B detects a repeated frame, encoder 430B drops the repeated frame from the frame sequence and instead only encodes uniquely rendered frames. This results in encoder 430B providing a bitstream with a variable frame rate 435B to decoder 440B.

In a further embodiment, scheme 405C is implemented with rendering unit 420C rendering frames at a variable frame rate 425C. In this embodiment, rendering unit 420C does not add repeated frames into the rendered frame sequence to create a fixed frame rate. Rather, rendering unit 420C conveys rendered frames to encoder 430C at the variable frame rate 425C which varies based on the amount of activity in the source application (e.g., video game application). Encoder 430C is configured to encode the rendered frames and to add skip frames to rendered frames as necessary to create an encoded bitstream at a fixed frame rate 435C. For example, if variable frame rate 425C is 30 fps and decoder 440C is expecting a fixed frame rate 435C of 60 fps, then encoder 430C can add a skip frame after each received frame. Encoder 430C then encodes the alternating skip and received frames into the encoded bitstream which is sent to decoder 440C. In some embodiments, decoder 440C expects a fixed frame rate 435C to avoid synchronization issues with the display, and encoder 430C is configured to generate the fixed frame rate 435C by adding skip frames to the frames rendered at the variable frame rate 425C.

In a still further embodiment, scheme 405D is implemented with rendering unit 420D rendering frames at a variable frame rate 425D. In this embodiment, rendering unit 420D does not add repeated frames into the rendered frame sequence to create a fixed frame rate. Rather, rendering unit 420D conveys rendered frames to encoder 430D at the variable frame rate 425D. Encoder 430D is configured to encode the rendered frames to create an encoded bitstream at variable frame rate 435D, which has the same number of frames per second as variable frame rate 425D. In this embodiment, encoder 430D does not add skip frames to the uniquely rendered frames. Rather, an encoded bitstream at a variable frame rate 435D is provided to decoder 440D. This embodiment can be implemented when decoder 440D is able to drive frames to a display at a variable frame rate without causing synchronization issues with the display.

It is noted that the same rendering unit, encoder, and decoder hardware implementation can alternate between implementing the different schemes 405A-D shown in FIG. 4. For example, in one embodiment, the same rendering unit, encoder, and decoder hardware implementation can have multiple operating modes, and the specific operating mode which is programmed for the hardware implementation determines which of schemes 405A-D is utilized. Alternatively, in another embodiment, a single rendering unit, encoder, and decoder implementation is configured to perform only a single one of the schemes 405A-D shown in FIG. 4.

Figure 5:
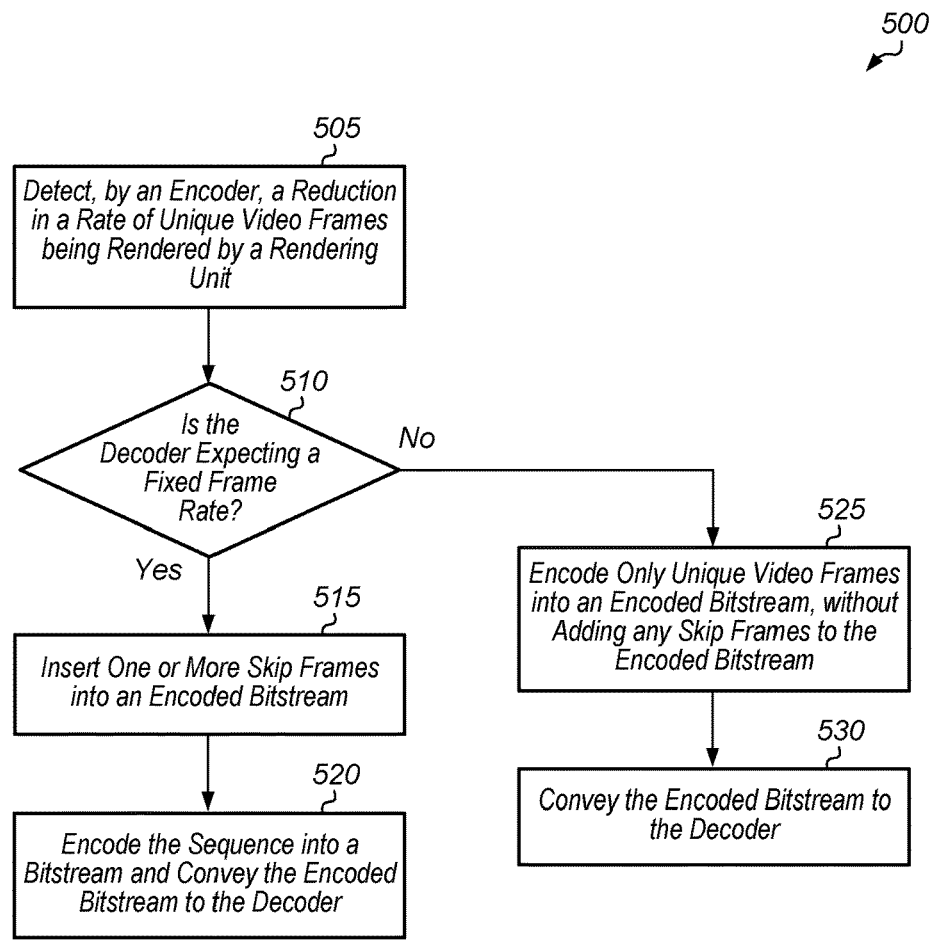
FIG. 5 is a generalized flow diagram illustrating one embodiment of a method for implementing an encoder for encoding rendered content on a server.
Figure 6:
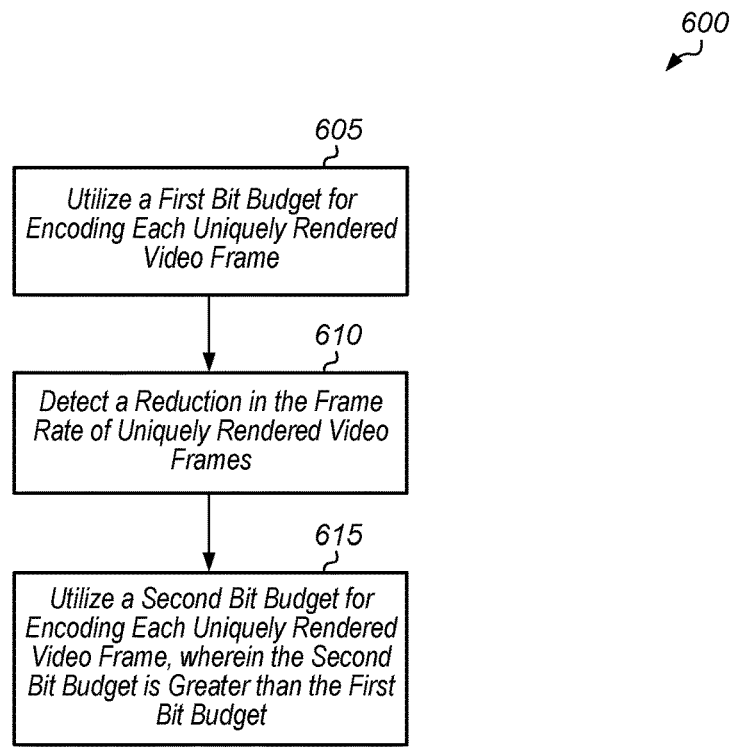
FIG. 6 is a generalized flow diagram illustrating another embodiment of a method for reallocating a bit budget for encoding rendered frames.
Figure 7:
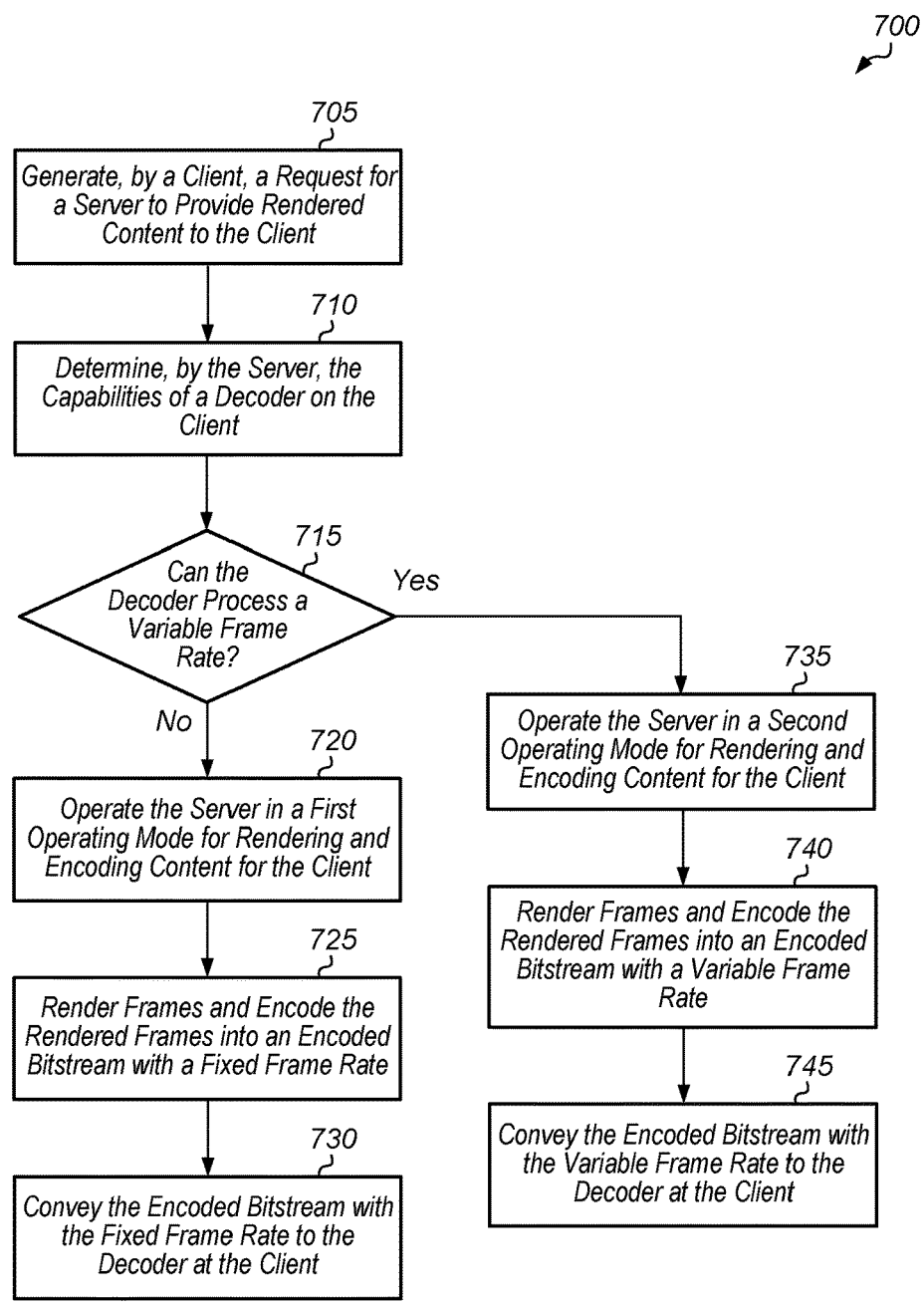
FIG. 7 is a generalized flow diagram illustrating one embodiment of a method for determining an operating mode for a server providing encoded content for a client.

Referring now to FIG. 5, one embodiment of a method 500 for implementing an encoder for encoding rendered content on a server is shown. For purposes of discussion, the steps in this embodiment and those of FIG. 6-7 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

An encoder detects a reduction in a rate of unique video frames being rendered by a rendering unit (block 505). For example, the rendering unit can reduce the rate at which unique video frames are being rendered due to a lack of motion in the current scene being rendered. While the frame rate at which unique video frames are being rendered can be reduced, the rendering unit can repeat some frames and then include the repeated frames in the sequence of rendered frames sent to the encoder to provide the encoder with a fixed frame rate. When the encoder detects repeated frames in the sequence of frames provided by the rendering unit, this indicates that the rate of unique video frames being rendered has been reduced. In one embodiment, the encoder is implemented on a system with at least one processor coupled to at least one memory device. In one embodiment, the encoder is implemented on a server which is part of a cloud computing environment.

In response to detecting the reduction in the rate of unique video frames being rendered, if the decoder expects to receive an encoded bitstream with a fixed frame rate (conditional block 510, "yes" leg), then the encoder inserts one or more skip frames into the encoded bitstream (block 515). In another embodiment, if the compression standard does not provide support for skip frames, then a skip frame indication can be signaled out-of-band to the decoder. In this embodiment, the encoder can encode a repeat frame and the decoder can decode the repeat frame but choose not to do anything with the repeat frame. Next, the encoder conveys the encoded bitstream to the decoder (block 520). In one embodiment, the video stream is encoded in accordance with a video compression standard (e.g., High Efficiency Video Coding (HEVC)). After block 520, method 500 ends.

In response to detecting the reduction in the rate of unique video frames being rendered, if the decoder is able to receive and process an encoded bitstream with a variable frame rate (conditional block 510, "no" leg), then the encoder encodes only unique video frames into a bitstream, without adding any skip frames to the bitstream (block 525). Next, the encoder conveys the encoded bitstream to the decoder (block 530). After block 530, method 500 ends.

Turning now to FIG. 6, one embodiment of a method 600 for reallocating a bit budget for encoding rendered frames is shown. An encoder utilizes a first bit budget for encoding each uniquely rendered video frame (block 605). The first bit budget corresponds to a specified bit rate of the encoded bitstream. For example, in one embodiment, the encoder utilizes a first bit budget which will generate a 2 Mbps encoded bitstream. In other embodiments, the encoder can generate bitstreams with other bit-rates.

Next, the encoder detects a reduction in the frame rate of uniquely rendered video frames (block 610). For example, the encoder can detect that one or more frames of the rendered video sequence are repeated. Then, in response to detecting that the frame rate of uniquely rendered video frames has been reduced, the encoder is configured to utilize a second bit budget for encoding each uniquely rendered video frame, wherein the second bit budget is greater than the first bit budget (block 615). In one embodiment, the second bit budget is calculated by increasing the first bit budget by a number proportional to the bit budget which was saved in the past "x" amount of time, wherein "x" is programmable. This increase in value is dynamic and the second bit budget can vary at different points in time during transmission of the video sequence. By increasing the bit budget used for encoding uniquely rendered video frames, these frames can be encoded with higher fidelity. After block 615, method 600 ends.

Referring now to FIG. 7, one embodiment of a method 700 for determining an operating mode for a server providing encoded content for a client is shown. A client generates a request for a server to provide rendered content to the client (block 705). The rendered content includes video frames or image frames generated for any of various types of applications. Next, the server determines the capabilities of a decoder on the client (block 710). For example, the server can determine if the decoder can process an encoded bitstream which has a variable frame rate (conditional block 715). If the decoder on the client can only process rendered content at a fixed frame rate (conditional block 715, "no" leg), then the server operates in a first operating mode for rendering and encoding content for the client (block 720). As part of operating in the first operating mode, the server renders frames and encodes the rendered frames into an encoded bitstream with a fixed frame rate (block 725). Next, the server conveys the encoded bitstream with the fixed frame rate to the decoder at the client (block 730). After block 730, method 700 ends.

If the decoder on the client can process rendered content at a variable frame rate (conditional block 715, "yes" leg), then the server operates in a second operating mode for rendering and encoding content for the client (block 735). While operating in the second operating mode, the server renders frames and encodes the rendered frames into a bitstream with a variable frame rate (block 740). Then, the server conveys the encoded bitstream with the variable frame rate to the decoder at the client (block 745). After block 745, method ends.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
 a rendering unit configured to dynamically adjust a rate at which video frames are rendered based on an amount of activity in a scene being rendered; and
 an encoder configured to encode rendered video frames;
 wherein the encoder is configured to:
  detect a reduction of a frame rate of rendered video frames;
  responsive to detecting said reduction:
   determine whether to create an encoded bitstream with a fixed frame or a variable frame rate based on capabilities of a decoder;
   encode the rendered video frames and one or more skip frames to create an encoded bitstream with a fixed frame rate while operating in a first operating mode;
   encode only the rendered video frames, without any skip frames, to create the encoded bitstream with a variable frame rate while operating in a second operating mode; and
  convey the encoded bitstream to a decoder.

2. The system as recited in claim 1, wherein the rendering unit is configured to:
 reduce a frame rate of rendered video frames responsive to receiving an indication from an application indicating that an amount of activity in a scene is less than a threshold; and
 repeat one or more video frames to create a sequence of frames of a fixed frame rate responsive to reducing the frame rate of uniquely rendered video frames.

3. The system as recited in claim 2, wherein the rendering unit is configured to convey, to the encoder, the sequence of frames at the fixed frame rate.

4. The system as recited in claim 1, wherein the rendering unit is configured to reduce a frame rate of uniquely rendered video frames responsive to receiving an indication from an application that a current scene can be rendered with a lower frame rate.

5. The system as recited in claim 4, wherein the encoder is configured to reallocate a remainder of bits of a bit budget for encoding unique video frames to allow the uniquely rendered video frames to be encoded with increased fidelity responsive to detecting repeated video frames in the sequence of frames provided by the rendering unit.

6. The system as recited in claim 1, further comprising a decoder, wherein the decoder is configured to perform a post decode comparison to determine if a current decoded frame is the same as a previous decoded frame.

7. The system as recited in claim 1, wherein the encoder is configured to determine an operating mode based on information received in a request for rendered content generated by the decoder and based on whether the decoder can process frames at a variable frame rate without causing synchronization issues.

8. A method comprising:
dynamically adjusting, by a rendering unit, a rate at which video frames are rendered based on an amount of activity in a scene being rendered;
detecting, by an encoder, a reduction in a frame rate of rendered video frames;
responsive to detecting said reduction:
determine whether to create an encoded bitstream with a fixed frame or a variable frame rate based on capabilities of a decoder;
encoding the rendered video frames and one or more skip frames to create an encoded bitstream with a fixed frame rate while operating in a first operating mode;
encoding only the rendered video frames, without any skip frames, to create the encoded bitstream with a variable frame rate while operating in a second operating mode; and
conveying the encoded bitstream to a decoder.

9. The method as recited in claim 8, further comprising:
reducing a frame rate of rendered video frames responsive to receiving an indication from an application indicating that an amount of activity in a scene is less than a threshold; and
repeating one or more video frames to create a sequence of frames of a fixed frame rate responsive to reducing the frame rate of uniquely rendered video frames.

10. The method as recited in claim 9, wherein the method further comprising conveying, from a rendering unit to an encoder, the sequence of frames at the fixed frame rate.

11. The method as recited in claim 8, further comprising the rendering unit reducing a frame rate of uniquely rendered video frames responsive to receiving an indication from an application that a current scene can be rendered with a lower frame rate.

12. The method as recited in claim 11, further comprising reallocating a remainder of bits of a bit budget for encoding unique video frames to allow the uniquely rendered video frames to be encoded with increased fidelity responsive to detecting repeated video frames in the sequence of frames provided by the rendering unit.

13. The method as recited in claim 8, further comprising sending an indication from the rendering unit to the encoder that the frame rate of rendered video frames has been reduced.

14. The method as recited in claim 8, further comprising determining an operating mode based on information received in a request for rendered content generated by the decoder and based on whether the decoder can process frames at a variable frame rate without causing synchronization issues.

15. An apparatus comprising:
a rendering unit configured to dynamically adjust a rate at which video frames are rendered based on an amount of activity in a scene being rendered;
a pre-encoding analysis unit configured to detect repeated frames in a sequence of frames; and
an encoder coupled to the pre-encoding analysis unit;
wherein the encoder is configured to:
receive an indication from the pre-encoding analysis unit that a frame rate of rendered video frames has been reduced; and
responsive to receiving said indication:
determine whether to create an encoded bitstream with a fixed frame or a variable frame rate based on capabilities of a decoder;
encode the rendered video frames and one or more skip frames to create an encoded bitstream with a fixed frame rate while operating in a first operating mode;
encode only the rendered video frames, without any skip frames, to create the encoded bitstream with a variable frame rate while operating in a second operating mode; and
convey the encoded bitstream to a decoder.

16. The apparatus as recited in claim 15, wherein the apparatus is further configured to:
reduce a frame rate of rendered video frames responsive to receiving an indication from an application indicating that an amount of activity in a scene is less than a threshold; and
repeat one or more video frames to create a sequence of frames of a fixed frame rate responsive to reducing the frame rate of uniquely rendered video frames.

17. The apparatus as recited in claim 16, wherein the rendering unit is configured to convey, to the encoder, the sequence of frames at the fixed frame rate.

18. The apparatus as recited in claim 16, wherein the rendering unit is configured to reduce a frame rate of uniquely rendered video frames responsive to receiving an indication from an application that a current scene can be rendered with a lower frame rate.

19. The apparatus as recited in claim 15, wherein the encoder is configured to reallocate a remainder of bits of a bit budget for encoding unique video frames to allow the uniquely rendered video frames to be encoded with increased fidelity responsive to said indication.

20. The apparatus as recited in claim 15, wherein the encoder is configured to determine an operating mode based on information received in a request for rendered content generated by the decoder and based on whether the decoder can process frames at a variable frame rate without causing synchronization issues.

* * * * *